(12) United States Patent
Nelson et al.

(10) Patent No.: US 7,668,912 B2
(45) Date of Patent: Feb. 23, 2010

(54) REAL-TIME ONE-BUTTON INTEGRATED SUPPORT FOR NETWORKED DEVICES

(75) Inventors: Steve Nelson, San Jose, CA (US); Chia-Hsin Li, San Jose, CA (US); Victor Ivashin, Danville, CA (US)

(73) Assignee: Seiko Epson Corporation, Tokyo (JP)

( * ) Notice: Subject to any disclaimer, the term of this patent is extended or adjusted under 35 U.S.C. 154(b) by 1073 days.

(21) Appl. No.: 11/073,272

(22) Filed: Mar. 3, 2005

(65) Prior Publication Data

US 2006/0200550 A1 Sep. 7, 2006

(51) Int. Cl.
*G06F 15/16* (2006.01)

(52) U.S. Cl. .................. 709/204; 709/224; 709/205; 358/1.14

(58) Field of Classification Search ............... 709/224, 709/204; 358/1.14
See application file for complete search history.

(56) References Cited

U.S. PATENT DOCUMENTS

| | | | |
|---|---|---|---|
| 5,202,726 A | 4/1993 | McCulley et al. | |
| 5,305,055 A | 4/1994 | Ebner et al. | |
| 5,369,469 A | 11/1994 | Leo et al. | |
| 5,392,095 A | 2/1995 | Siegel | |
| 5,414,494 A | 5/1995 | Aikens et al. | |
| 5,568,618 A | 10/1996 | Motoyama | |
| 5,678,002 A | 10/1997 | Fawcett et al. | |
| 5,715,496 A | 2/1998 | Sawada et al. | |
| 5,835,816 A | 11/1998 | Sawada et al. | |
| 5,887,216 A | 3/1999 | Motoyama | |
| 5,913,090 A | 6/1999 | Sawada et al. | |
| 5,995,771 A | 11/1999 | Miyawaki | |
| 6,141,507 A | 10/2000 | Sawada | |
| 6,317,570 B1 | 11/2001 | Uchida et al. | |
| 6,415,392 B1 | 7/2002 | Suzuki et al. | |
| 6,487,375 B2 | 11/2002 | Ferrer et al. | |
| 6,587,647 B1 | 7/2003 | Watanabe et al. | |
| 6,606,460 B2 | 8/2003 | Konno | |
| 6,629,134 B2 | 9/2003 | Hayward et al. | |
| 6,631,247 B1 | 10/2003 | Motoyama et al. | |
| 6,693,661 B1* | 2/2004 | Vanderwilt et al. | 348/14.01 |
| 7,007,190 B1* | 2/2006 | Kurapati et al. | 714/4 |
| 2002/0001475 A1 | 1/2002 | Kikuchi et al. | |
| 2003/0044184 A1 | 3/2003 | Yano et al. | |
| 2003/0086109 A1* | 5/2003 | Fitch | 358/1.14 |
| 2003/0118354 A1 | 6/2003 | Konno | |
| 2003/0172148 A1* | 9/2003 | Simpson et al. | 709/224 |
| 2004/0030750 A1* | 2/2004 | Moore et al. | 709/204 |
| 2004/0047342 A1* | 3/2004 | Gavish et al. | 370/352 |
| 2004/0073953 A1* | 4/2004 | Xu et al. | 725/146 |
| 2004/0236830 A1* | 11/2004 | Nelson et al. | 709/204 |
| 2006/0265656 A1* | 11/2006 | Lambert et al. | 715/705 |

* cited by examiner

*Primary Examiner*—Jeffrey Pwu
*Assistant Examiner*—Shripal K Khajuria (57) ABSTRACT

A method and system for providing technical support for networked devices includes a first client component on a networked device having a conferencing application to enable communication exchange with a second client component. A server component is configured to distribute video and audio data streams to the first client component and the second client component in a conference session. A conference channel communication connection is established over which the video and audio data streams are carried between the first client component, the server component, and the second client component, and a back-channel communication connection is established for transmission of diagnostic and status information. A service call is managed by a service center dispatcher, who connects a technician client and a networked device client in a multi-party conference hosted on one of a plurality of load balanced servers.

12 Claims, 8 Drawing Sheets

REAL-TIME ONE-BUTTON INTEGRATED SUPPORT FOR NETWORKED DEVICES

BACKGROUND OF THE INVENTION

The present invention relates generally to the transmission of information across the Internet, and more specifically to methods, systems, and apparatuses for providing real-time and integrated support for equipment and tools across the Internet and within networks and networked systems.

When a tool, piece of equipment, device, etc., such as copier, printer or scanner is sold to a customer, many situations can happen to make the device malfunction. Examples of these situations occurring in the exemplary copier, printer, or scanner include a paper jam, toner low, out-of-paper, and empty ink cartridge, etc.

While typical users may attempt to troubleshoot the above problems, they are usually unable to either identify the problems or to take the appropriate corrective action to rectify the problems because of the lack of resources, technical familiarity with the device, device self-diagnostic capabilities, etc. Such problems then usually result in the generating of a service call to manufacturer's technical support department.

In providing device support, a support technician will typically attempt to assist the users to trouble shoot the problems. Generally, there are two stages in troubleshooting the device:

Device diagnostic. In this stage, the technician will typically instruct the user to check the devices, run several tests on the devices and describe the syndrome to the technician.

Problem solving. In this stage, the technician will typically instruct the user to perform a series of possible corrective procedures to the device, and after each procedure, may need to go back to the first stage.

During the above stages, however, miscommunication can, and often does, occur between the technician, who is trained and technically skilled with the device, and the typical lay user, because the technician and the user may have very different backgrounds relative to the problem at hand, and consequently do not use the same terminology to describe the problem.

In addition, just getting in contact with a technician can be an ordeal. Calling for device technical support involves finding the correct phone number on the user's manual. Once connected the call may be forwarded several times in order to reach the right technician, or the user may have to navigate elaborate automated or other voice mail, the user may have to identify and locate device model and serial numbers, a customer number, a service contract number, etc., all to obtain help with the device problems. It is usually a very painful and time-intensive experience for a user to contact the right technician for the device in question, to diagnose the device problems, and to correctly perform a series of actions to rectify and resolve the device problems. The entire procedure may sometimes still result in having to have the technician come to the customer's site to look at the device which further increases the cost to operate the device.

What is needed is a method and system to enable technicians and customers to easily communicate to identify device problems and to enable the technicians help the customers to solve the problems efficiently.

SUMMARY OF THE INVENTION

Broadly speaking, the present invention fills these needs by providing a method and system whereby technicians and customers are interactively connected in a multi-party conference, real-time, over the Internet using network communication protocol. The present invention can be implemented in numerous ways, including as a system and a method, which may be implemented through execution of instructions on a computer readable medium. Several embodiments of the present invention are described below.

In one embodiment, a system for providing technical support for a device is provided. The system includes a first client component having a conferencing application to enable communication exchange with a second client component. The system further includes a server component configured to distribute video, audio and device diagnostic data streams to the first client component and the second client component in a conference session. A conference channel communication connection is provided over which the video and audio data streams are carried between the first client component and the server component, and between the second client component and the server component. A back-channel communication connection provides for diagnostic and status information to be transmitted to the server component. The back-channel communication connection enables diagnostic and status information about the device to be transmitted to the first client component and to the second client component in real-time.

In another embodiment, a method of providing service for networked equipment is provided. The method includes providing a networked device client having an Internet connection and a multi-participant conferencing application, and providing a service technician client having another multi-participant conferencing application. Additionally, the method includes providing a network support center. The network support center includes a plurality of network servers. Each one of the plurality of network servers has a server component of the multi-participant conferencing application, and is configured to distribute video, audio and device diagnostic data streams to the networked device client and to the service technician client in a technical support conference session. The network support center also includes a load balancer and a dispatcher. The method for providing service for networked equipment then provides for establishing a network connection between the networked device client, the service technician client, and the network support center. Further, diagnostic test results data from the networked device client are provided, and corrective instruction to the networked device client is also provided. The method is performed by communication exchange according to network communication protocol.

In a further embodiment, a back-channel communication network in a videoconferencing system for providing technical support of a networked device is provided. The back-channel communication network includes a diagnostic and status application associated with a client. The client is configured to execute a peer-to-peer videoconferencing application, and the diagnostic and status application monitors diagnostic operations performed by the networked device and provides a diagnostics results display to the peer-to-peer conferencing application. The back-channel communication network further includes a back-channel controller for diagnostics and status in communication with the diagnostic and status application over a back-channel connection. The back-channel controller for diagnostics and status is configured to enable communication between the client and another conference client over a back-channel controller for diagnostics and status communication link.

In yet another embodiment, a computer readable media having program instructions for providing video and audio streams for a videoconference session between a plurality of participants is provided. The computer readable media includes program instructions for providing a plurality of clients. Each of the plurality of clients is associated with a participant. Further, program instructions are provided for providing a server in communication with the plurality of clients, and for establishing a first communication channel and second communication channel between the server and each of the plurality of clients. The first communication channel provides audio/video data, and the second communication channel provides diagnostic and status information. Additional program instructions provide for commanding diagnostic operations on a networked device of a client and for receiving diagnostics results data over the second communication channel simultaneously with the audio/video data being supplied over the first communication channel.

Advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

An invention for a method and system for real-time, one-button, integrated support for networked devices is provided. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

In general, embodiments of the present invention provide a system solution for technicians and customers to easily communicate to identify device problems and to facilitate the technicians to help the customers solve the identified problems effectively and efficiently. Embodiments of the present invention can be implemented with a variety of tools, equipment, or other devices that occasionally or frequently require service, and that can or do have Internet access, and/or are routinely networked, with or without a firewall. Embodiments of the present invention are illustrated using typical office machines such as EPSON's Offirio products (Office Document Management Products), available from SEIKO EPSON Corporation of Japan, and worldwide. Since it is increasingly common for office machines such as document centers including one or more of printers, facsimile machines, copiers, scanners, various combinations of such equipment, and other similar devices, to be implemented in a networked environment, the exemplary office machines are ideally suited to illustrate embodiments of the present invention. Of course, the present invention can be implemented in any type of device, tool, or piece of equipment capable of Internet access, and the exemplary office equipment should therefore not be construed as exclusive or limiting.

Figure 1:
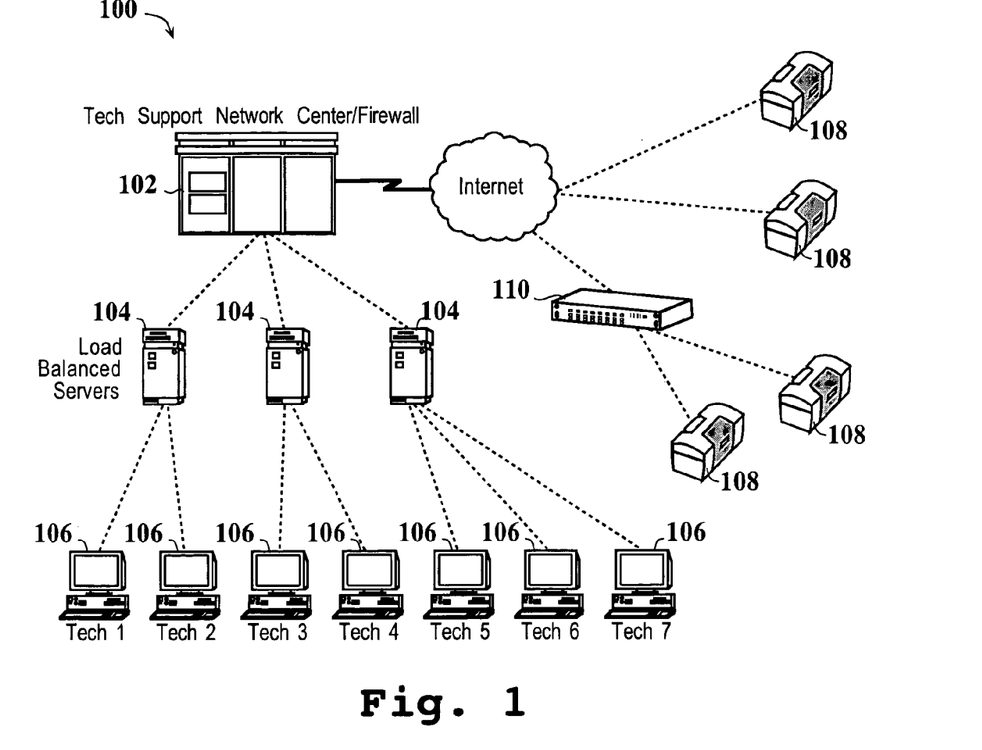
FIG. 1 is a high level schematic of the general system architecture supporting real-time, one-button integrated support for networked devices in accordance with embodiments of the present invention.

FIG. 1 is a high level schematic 100 of the general system architecture supporting real-time, one-button integrated support for networked devices in accordance with one embodiment of the present invention. The technical support network center 102, typically protected by a firewall and connected to the Internet through a high bandwidth network, includes a plurality of load balanced network servers 104 hosting a plurality of technician clients 106. Office machines such as copiers 108 are connected directly to the Internet, or through a router device 110. In one embodiment, each copier 108 includes a client application such as a video-conference application to enable a support session between a technician client 106 and the copier 108, hosted by one of the plurality of load balanced network servers 104.

In one embodiment of the invention, the technical support network center includes a video-conferencing system and application to enable real-time audio and video communication between a technician client 106 and a copier (or any other type of device or tool) client 108. In one embodiment, the video-conferencing system and application is similar to that which is described in co-pending U.S. patent application Ser. No. 10/192,130, entitled "METHOD AND APPARATUS FOR CONTROLLABLE CONFERENCE CONTENT VIA BACK-CHANNEL VIDEO INTERFACE," filed on Jul. 10, 2002 and assigned to the assignee of the present application. The disclosure of co-pending U.S. patent application Ser. No. 10/192,130 is incorporated herein by reference for all purposes.

In general, embodiments of the present invention utilize a multi-user conferencing environment to connect technicians with customers and their office equipment, such as the copier 108 illustrated in FIG. 1, in real time, and using network communication protocols. In one embodiment, a multi-user conferencing environment includes a multi-point control unit enabled to provide multi-participant features while connecting clients having peer-to-peer videoconferencing software. The connected clients are the technician and the customer/copier. The conferencing system includes a parallel connection to the conference channel, a "back channel," that enables the ability to command, direct, and interpret device, e.g., copier 108 in FIG. 1, diagnostics while the technician and the customer communicate via audio and video transmissions on the conference channel.

In one embodiment described in co-pending U.S. patent application Ser. No. 10/192,130, a participant's interactions that occur in a window displaying the video stream are monitored. In effect, the client monitor acts similarly to a conference user, with respect to watching the pre-existing videoconferencing software's video stream. Embodiments of the present invention utilize the client monitor and back-channel as a diagnostics application and controller in which technician or customer can command device self-diagnostic tests, as well as receive test result data. The former client monitor, in embodiments of the present invention, is a device status monitor and diagnostic application. It should be appreciated that the code defining the device status monitor and diagnostic application executes externally to the conference client, i.e., the device status monitor and diagnostic application code is separate and distinct from the conference client software.

The videoconferencing system generally includes a client component and a server component. The client component, implemented in a technician client and a customer/device client, includes a conference client and a diagnostic/status client. In one embodiment, the diagnostic/status client is capable of receiving input from and providing data to the conference client. In one embodiment, the conference client is a peer-to-peer videoconferencing application. One example of a peer-to-peer videoconferencing application is MICROSOFT'S NETMEETING application. However, one skilled in the art will appreciate that any peer-to-peer videoconferencing application is suitable for the embodiments described herein.

The diagnostic/status client enables control and interpretation of a plurality of diagnostic procedures on the tool or device. Diagnostic commands and data are transmitted through the server component using a separate connection, i.e., a back-channel connection or system that operates in parallel with the existing conference client's conference channel. In one embodiment, the back-channel system enables a technician client to receive data from a plurality of diagnostic procedures performed by the tool or device, while the customer operator of the customer/device client is describing the device problems encountered over the conference channel. In another embodiment, the technician client can send device commands to the customer/device client, and the customer/device client can send results data back to the technician client, over the back-channel system, while the technician and the customer operator describe and discuss events and actions, etc., over the conference channel.

Figure 2:
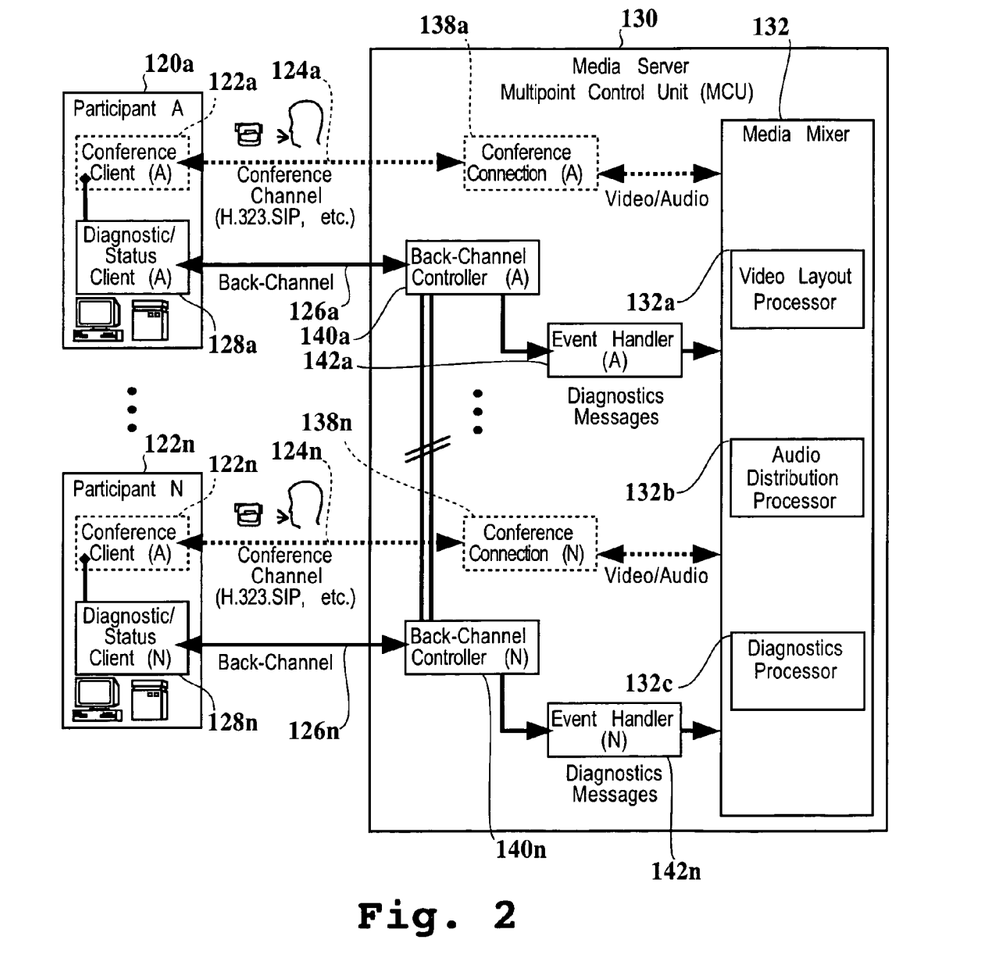
FIG. 2 is a schematic diagram of the components for a multi-participant conference system using a diagnostic/status client back-channel in accordance with embodiments of the invention.

FIG. 2 is a schematic diagram of the components for a multi-participant conference system using a diagnostic/status client back-channel in accordance with one embodiment of the invention. The client component includes multiple participants, such as participant A 120*a* through participant N 120*n*. Each participant 120 includes conference client 122 and diagnostic/status client 128. For example, participant A 120*a* includes conference client A 122*a* and diagnostic/status client A 128*a*. In one embodiment, conference client A 122*a* includes the participant's peer-to-peer videoconferencing software. Participants A 102*a*-N 102*n* can be customer/device clients or technician clients. In a typical implementation, one customer/device client would conference with one technician client to effect service or support for the customer device. In another embodiment, additional technician clients can "conference in" to provide additional technical expertise, or supervisory monitoring or support, etc.

Typically, a service call is initiated by a customer/device client, which is then joined with a technician client as described in greater detail below, but any client is capable of initiating a conference connection. It should be appreciated that calls from conference client A 122*a* route through media hub server 130. In one embodiment, conference client A 122*a* includes a high-level user-interface for the conference, such as when the conference client is a pre-existing software application. For example, a product that provides peer-to-peer videoconferencing is the NETMEETING application software from MICROSOFT Corporation.

In one embodiment of the invention, diagnostic/status client A 128*a* receives input such as device commands, etc., from conference client A 122*a*, and provides output such as diagnostic and status results data, etc., to conference client A 122*a*. In another embodiment, the diagnostic/status client A 128*a* is enabled to provide data to conference client A 122*a*, but does not receive input from conference client A 122*a*. In one embodiment, diagnostic/status client A 128*a* enables a technician client to, for example, receive status information and diagnostic results data from a customer's device or tool, and to issue device commands, such as diagnostic test commands to the customer's device or tool. In another embodiment, conference client A 122*a* enables a technician client to receive status information and self-diagnostic results data from a customer's device or tool, but is not enabled to issue commands to the device or tool. In such an embodiment, a technician might, for example, verbally instruct a customer to perform or initiate specific diagnostic tests or procedures. The back-channel configuration of the diagnostic/status client enables diagnostic functionality during simultaneous technician and customer/operator communication using audio and/or video over the conference channel.

In one embodiment, the diagnostic/status client 128 connects over back-channel connection 126 to a back-channel controller for diagnostics/status 140 of the media hub server multipoint control unit (MCU) 130. The MCU 130 is essentially the server component of the videoconferencing system. The back-channel controller for diagnostics/status 140 connects the diagnostic/status client 128 of, typically, a technician client (also referred to as a technician participant 120), and a customer/device client (also referred to as a customer/device participant 120), and processes the exchange of diagnostic and status commands, data, etc.

In one embodiment, an event handler 142 is provided to process specified diagnostic and status events, operations, display, etc. In an embodiment of a multi-participant conference system as illustrated in FIG. 2, the event handler 142 interfaces with a media mixer 132, which typically enables such functionality as video layout and audio distribution for both conference channel 124 data exchange and back channel 126 data exchange. In the illustrated embodiment, a Diagnostics Processor 132*a* is incorporated into the media mixer 132 to facilitate integration of the specialized diagnostics functionality into a general application multi-participant video conferencing system such as the one illustrated in FIG. 2. In this embodiment, for example, event handler 142 interfaces with the diagnostics processor 132*a* to enable processing of diagnostics messages transmitted over back channel 126. In another embodiment of the present invention, event handler 142 interfaces with a dedicated diagnostic/status processor (not shown), independent of and separate from the media mixer 132, and dedicated to the processing of device diagnostic procedures, status information, and associated processing of command and reporting.

In one embodiment of the invention, conference connection 138 provides for the audio and video portions of a video conference, e.g., between a technician participant 120 and a customer/device participant 120. By way of example, a customer/device participant 120 places a call, as described in greater detail below, to technical support. Technical support network center 102 (see FIG. 1) assigns a technician 106 (having a technician client, see FIG. 1) and a host server 104 (see FIG. 1), and facilitates the connection of a customer/ device client 120 and a technician client 120, in a video conference hosted on one of a plurality of load balanced servers 104. Media mixer 132 is a component of the MCU 130, and provides for the video layout using video layout processor 132a, and further provides for the audio distribution with audio distribution processor 132b. In one embodiment, media mixer 132 also incorporates a diagnostics processor 132c for processing of diagnostics messages, commands, status, etc.

It should be appreciated that embodiments of the present invention are implemented using network protocols to achieve the described and illustrated communications. In one embodiment, customary TCP and UDP protocols are utilized as typically implemented in videoconferencing applications. In another embodiment, an inventive "connectionless" TCP protocol is utilized to enhance the speed and quality of the TCP videoconferencing connection. More information about connectionless TCP can be found in co-pending U.S. patent application Ser. No. 10/681,732, entitled "CONNECTIONLESS TCP/IP DATA EXCHANGE," filed on Oct. 8, 2003, and assigned to the assignee of the present application. The disclosure of co-pending U.S. patent application Ser. No. 10/681,732 is incorporated herein by reference for all purposes.

Figure 3:
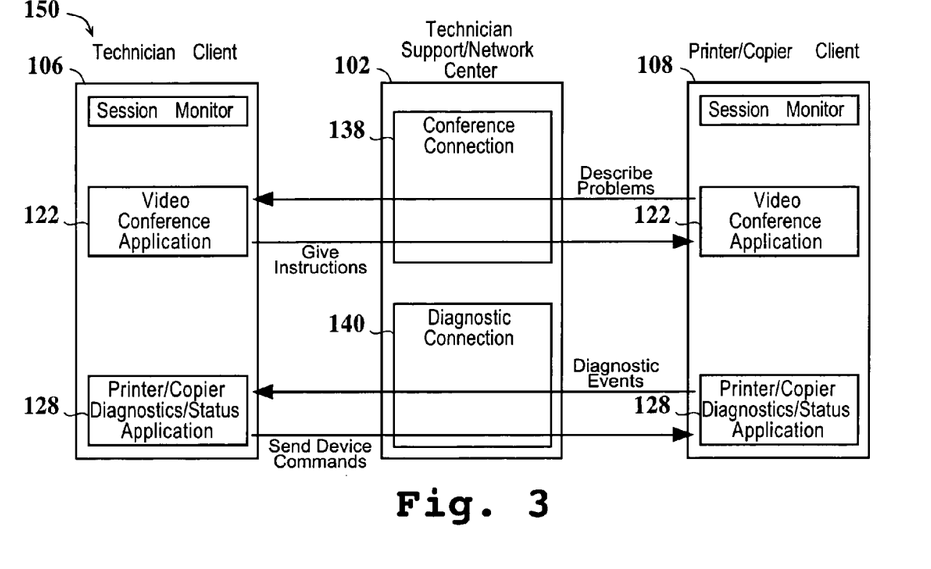
FIG. 3 shows a schematic of a service session in accordance with embodiments of the present invention.

FIG. 3 shows a schematic 150 of a service session in accordance with one embodiment of the present invention. The exemplary service session illustrates the implementation of the multi-participant conference system illustrated in FIG. 2 and includes a technician client 106 and a printer/copier (or other device or tool) client 108 connected through a technician support/network center 102. Both the technician client 106 and the printer/copier client 108 include a video conference application 122 connected by a conference connection 138. The video conference application enables a customer at the printer/copier client 108 to describe problems or desired service and support to the technician client 108, and further enables the technician client 106 to give instructions to or obtain additional information from the customer at the printer/copier client 108. In one embodiment, the printer/copier client 108 may or may not include a video transmission capability, but does include, at least, an audio capability.

In one embodiment, the technician client 106 and the printer/copier client 108 include a printer/copier (or other device or tool) diagnostics and status application 128. The diagnostics and status application 128 is connected during the service session by a diagnostic connection 140, which, in one embodiment, is a back-channel connection. The diagnostic connection 140 enables the printer/copier to provide status and diagnostics results data to the technician. In one embodiment, the technician client 106 uses the diagnostics results data to issue instructions to the customer at the printer/copier client 108 over the conference connection 138. In another embodiment, the technician client 106 utilizes the printer/copier diagnostics and status application 128 to issue device commands over the diagnostic connection 140 to the printer/copier client 108. In one embodiment of the invention, the parallel conference connection 138 and diagnostic connection 140 enable simultaneous communication and service using video conferencing capabilities between a service technician and a customer, and using the diagnostic connection capabilities to exchange diagnostic and status commands and results data.

Figure 4:
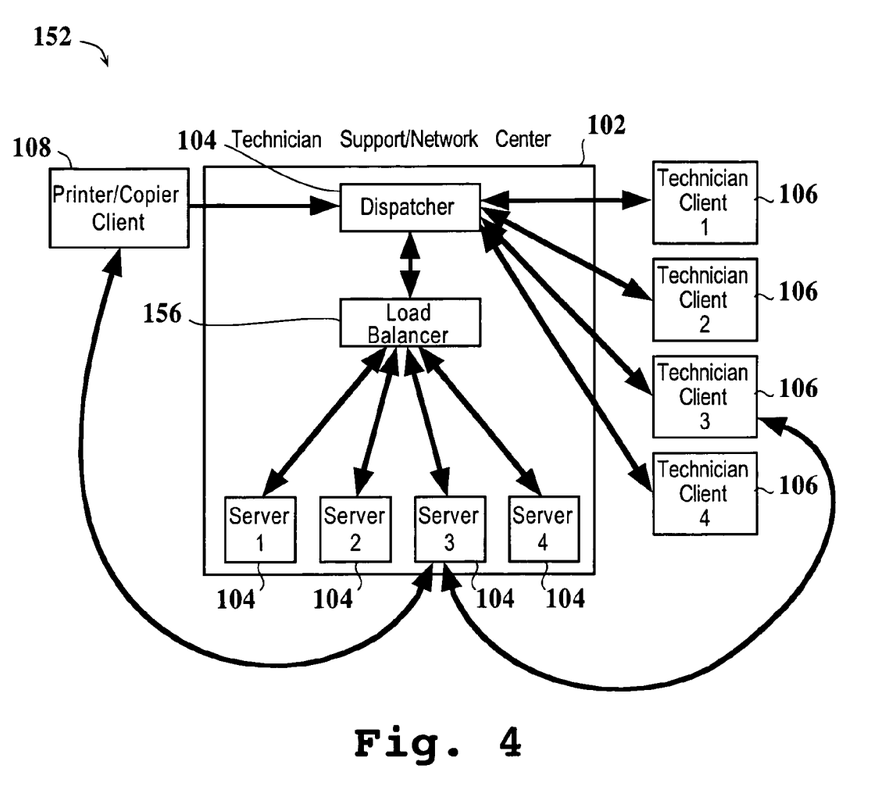
FIG. 4 is a system diagram of the technician support/network center in accordance with embodiments of the present invention.

FIG. 4 is a system diagram 152 of the technician support/network center 102 in accordance with an embodiment of the present invention. The technician support/network center 102 hosts the server component of the multi-user videoconferencing system described above. Printer/copier client 108 and a technician client 106 are joined by the technician support/network center 102 to effect a service session as described above.

In one embodiment, the technician support/network center 102 includes a dispatcher 154, a load balancer 156, and a plurality of network servers 104. The dispatcher 154 receives service requests and dispatches the service requests to an available technician. If no technician is available, the request will be queued, in one embodiment, until the next technician is available to help.

The technician support/network center 102 also includes a load balancer 156. The load balancer 156 assesses the system load of the plurality of network servers 104, and chooses one server to which a service session is assigned. In one embodiment, the load balancer 156 ensures a distribution of resource demands, enhancing the quality of service received by all customers. In one embodiment, the dispatcher 154 maintains a queue of service requests, and receives information from the load balancer 156 regarding server 104 availability, and current resource demand. When a technician client 106 becomes available for a service session, the dispatcher 154 uses the information from the load balancer 156 to select one of the plurality of network servers 104 to host a service session. The dispatcher 154 then assigns the printer/copier client 108 and the available technician client 106, to a particular identified server 104 to conduct the service session. In another embodiment, each technician client 106 maintains a queue of customers awaiting service. At such time as the technician client 106 is ready to begin a new service session with the next customer in the customer service queue, the dispatcher 154 communicates with the load balancer 156 and selects the most appropriate network server 104 to host the session.

Finally, the technician support/network center 102 includes a plurality of network servers 104. As described above, the plurality of network servers 104 each include the network component of a videoconferencing application as described above in reference to FIGS. 2 and 3. In one embodiment, a specialized IMX server is utilized for the plurality of network servers 104. IMX servers will host the service sessions created by the dispatcher and the load-balancer. The printer/copier client 108 includes an IMX client application, and the technician client 106 also includes an IMX client application, and the clients are enabled to communicate through the IMX servers. More detailed information regarding the IMX server can be found in the above-referenced co-pending U.S. patent application Ser. No. 10/192,130.

In one embodiment of the invention, the printer/copier client 108 and the technician client 106 are specialized client participants exchanging diagnostic and status information about a printer, copier, or other device or tool, in a multi-participant conferencing environment. In one embodiment, the multi-participant conferencing environment is a videoconferencing environment, with all participants transmitting and receiving audio and video information on the conference channel, in addition to status and diagnostic information on the back-channel. In another embodiment, the multi-participant conferencing environment is a limited videoconferencing environment in which, for example, the printer/copier client 108 receives audio and video transmitted by the technician client 106, but the printer/copier client 108 sends only audio and not video information to the technician client 106. Other embodiments encompass various combinations of audio and video exchange between participants.

Figure 5:
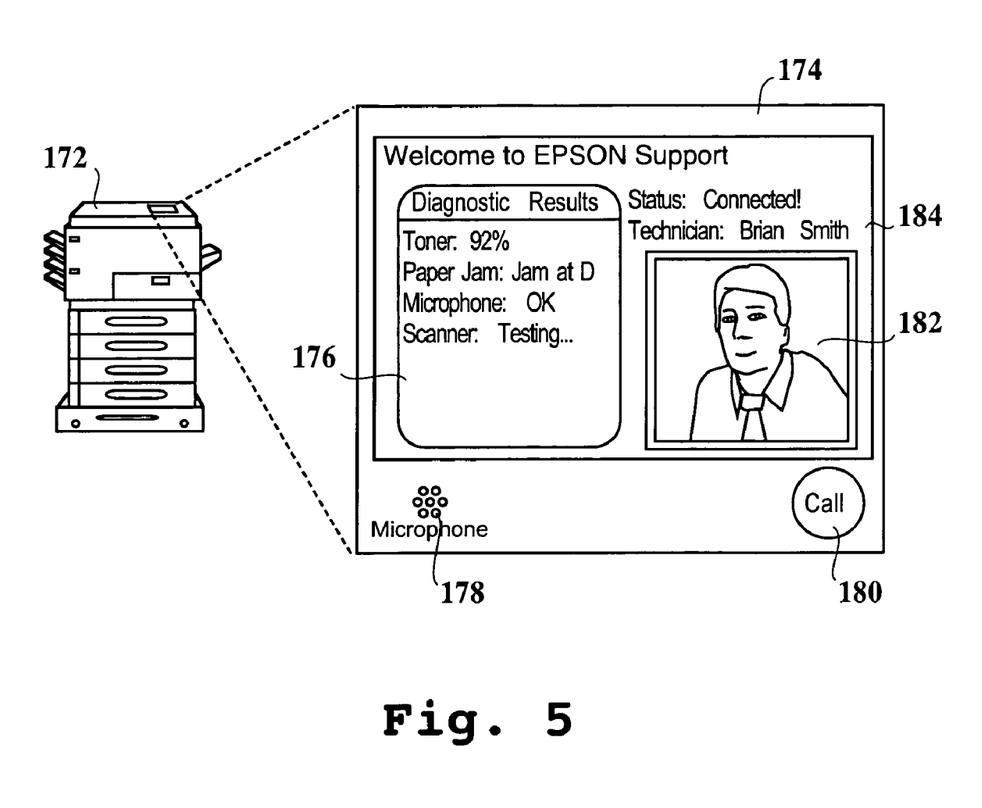
FIG. 5 illustrates the display at the exemplary printer/copier panel in accordance with an embodiment of the present invention.

FIG. 5 illustrates the display at the exemplary printer/copier panel in accordance with one embodiment of the present invention. As described above in reference to FIGS. 1-4, a printer, copier, facsimile machine, scanner, or other similar office tool or combination of office tools, and represented herein by an exemplary printer/copier 172, includes an installed and configured printer/copier client 108, enabling the printer/copier 172 to be a participant in a multi-participant conferencing environment.

In FIG. 5, an exemplary printer/copier panel 174 illustrates printer/copier functionality in accordance with an embodiment of the invention. Printer/copier panel 174 includes a video display 182 of a technician or other service and support person, typically transmitted from the technician client 106 (see FIG. 4). A microphone 178 and speaker (not shown) are provided for capturing, transmitting, and playing audio between the printer/copier client 108 (see FIG. 4) and the technician client 106. In a typical service session, a customer at the printer/copier panel 174 describes problems or other requested service to a service technician at a technician client 106, and receives instructions, guidance, information, etc., in return. In one embodiment, a video capturing camera (not shown) is provided in addition to the microphone 178, for transmitting captured video in addition to audio.

A diagnostic results window 176 is also provided to the printer/copier panel 174 in one embodiment of the invention. The diagnostic results window 176 lists the diagnostics results data from any of a plurality of diagnostic procedures performed on the printer/copier 172, or other machine or tool as appropriate. In one embodiment, the diagnostic results window 176 on the printer/copier panel 174 is identical to that found on the technician's session monitor 206 (see FIG. 6 below). In another embodiment, the diagnostic results window 176 at printer/copier panel 174 provides only minimal or a summary of results data, while the technician's session monitor 106 provides additional detail.

Also included on the printer/copier panel 174 is call button 180. In accordance with one embodiment of the present invention, call button 180 provides one-button, direct access to the technician support/network center 102 (see FIG. 4). With call button 180, a customer at the printer/copier 172 initiates a service session by calling into the technician support/network center 102 (see FIG. 4). In one embodiment, the printer/copier client 108 (see FIG. 4) is programmed with appropriate host addresses, and calls into the technician support/network center through an Internet connection using network communication protocols to request service or support. A dispatcher 154 (see FIG. 4) connects the printer/copier client 108 with a technician client 106 (see FIG. 4), hosted by one of a plurality of load balanced network servers 104, as described above in reference to FIG. 4. Looking again at FIG. 5, once the service session has been established, the exemplary printer/copier panel 174 shows the video from the technician client 106 displayed at 182, and the technician's name and the session status is displayed at 184. Of course, FIG. 5 is intended to provide an exemplary lay-out and display at printer/copier panel 174 in accordance with one embodiment of the invention, and other embodiments provide alternative lay-outs and displays.

Figure 6:
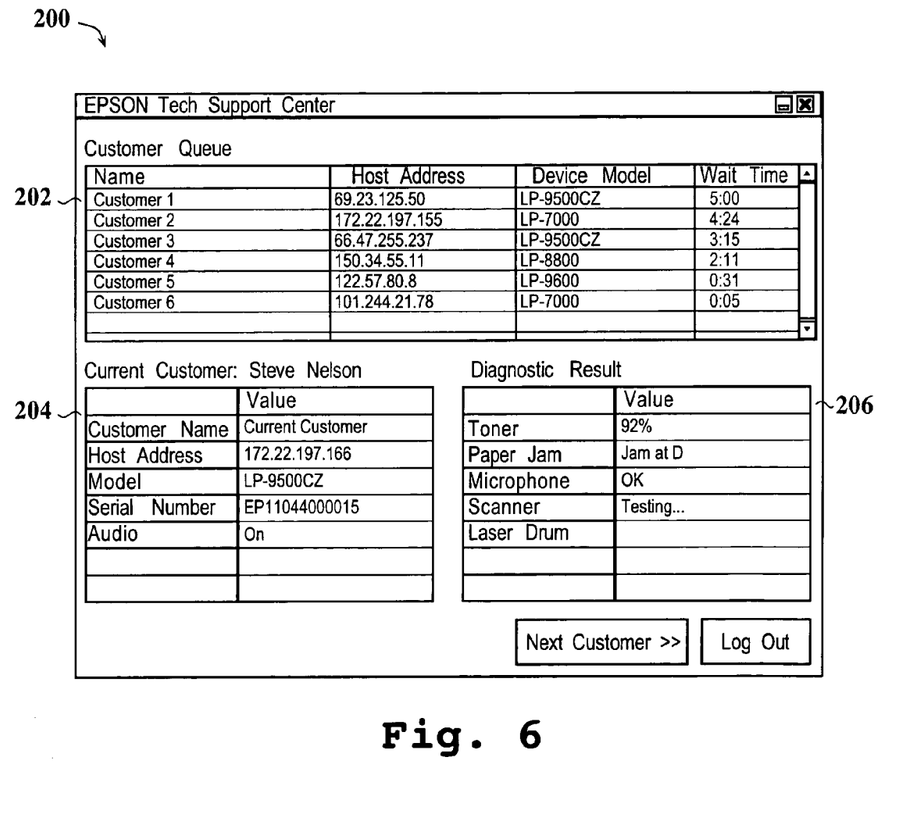
FIG. 6 shows an exemplary session monitor as displayed at a technician client in accordance with an embodiment of the present invention.

FIG. 6 shows an exemplary session monitor 200 as displayed at a technician client in accordance with one embodiment of the present invention. In the illustrated embodiment, generally three display areas or regions in the session monitor 200 are shown. The customer queue window 202 shows the customer names, host addresses, device model numbers, and elapsed wait time. In one embodiment, the queue is maintained by the dispatcher 154 (see FIG. 4), and then each waiting customer is assigned to a technician client and a host server upon the availability of a technician to take the service call, as described above in reference to FIG. 4. In another embodiment, each configured technician client 106 maintains a queue of customers, assigned in a rotating scheme as service calls are received, and upon availability to take the service call, the technician client 106 and the printer/copier client 108 are assigned an appropriate load balanced server 104 to host the service call, and the session is established. FIG. 6 illustrates an exemplary queue window 202 displaying the queue information on the technician client 106.

Also displayed in the session monitor 200 of FIG. 6, is current customer window 204. In the illustrated embodiment, fields such as customer name, host address, model number of the printer/copier device, serial number of the printer/copier device, audio status are included. The printer/copier has a printer/copier client on board, and such information as the model and serial number are automatically included in the communication from the printer/copier device. In other embodiments, fields in the current customer window are customizable according to the device or tool, service agreement, etc.

A diagnostic result window 206 is also provided in one embodiment of the invention. The diagnostic result window 206 typically displays the diagnostic results data for the device or tool. In one embodiment, the diagnostic result window 206 displays the same information as displayed in the diagnostics results window 176 of the printer copier panel 174 illustrated and described in FIG. 5. In another embodiment, the diagnostic result window 206 of the session monitor 200 is customizable by a technician to display additional, detailed information not available to a customer. Further, in one embodiment, diagnostic result window 206 includes fields for additional diagnostic procedures and an interface, such as executable buttons, for commanding the device to execute additional diagnostic procedures. As described above in reference to FIGS. 1-3, the technician client 106 (see FIG. 4) includes a diagnostic/status client that communicates with the diagnostic/status client of the printer/copier client 108 (see FIG. 4) over a back-channel connection. In one embodiment, technician client 106 receives and displays results data in the diagnostic result window 206.

Figure 7:
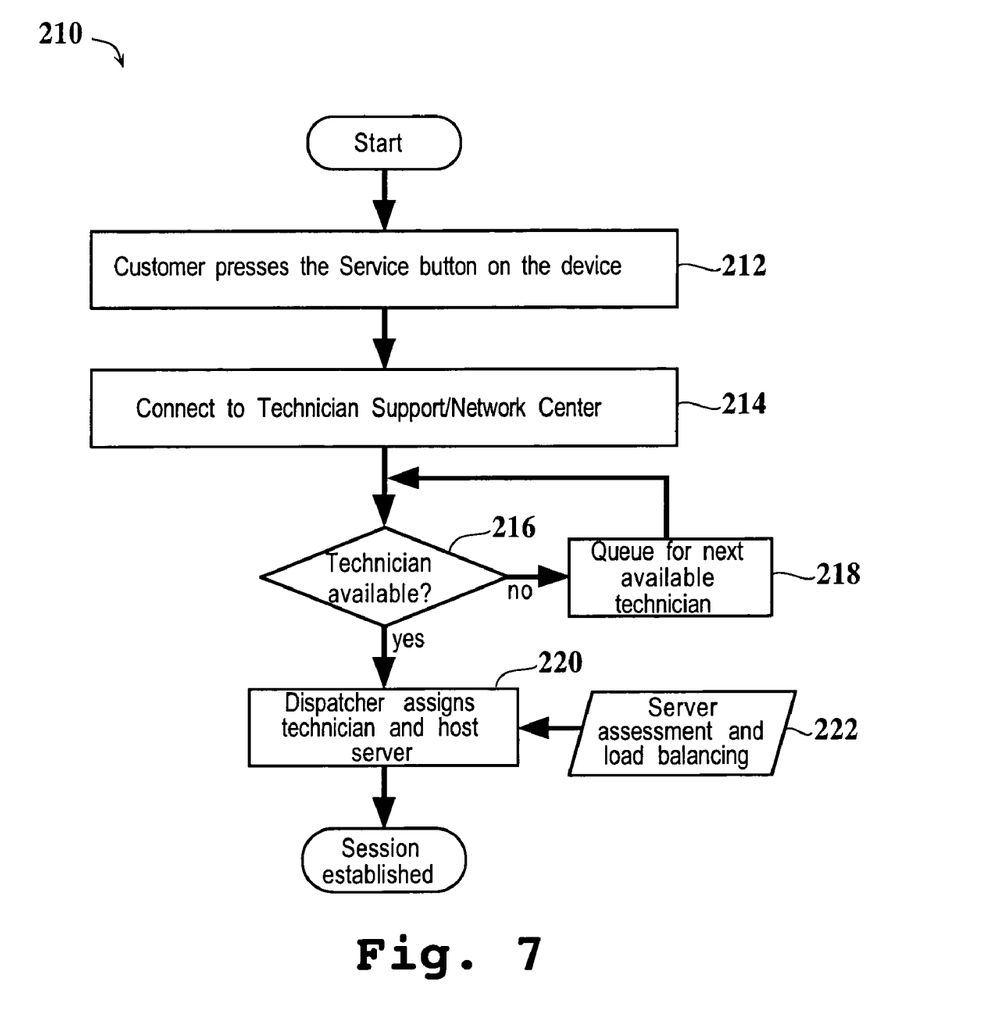
FIG. 7 is a flowchart diagram of the method operations performed in establishing a service session in accordance with embodiments of the present invention.

FIG. 7 is a flowchart diagram 210 of the method operations performed in establishing a service session in accordance with one embodiment of the present invention. The method begins with operation 212 in which a customer presses the service button on the copier, printer, or whichever device or tool is configured and used. As described above, configured tools and devices include a plurality of office equipment such a document centers having one or more printers, faxes, copy machines, scanners, or various combinations thereof, and exemplified herein by the Offirio line of products, available from SEIKO EPSON Corporation of Japan, and worldwide.

In one embodiment, the pressing of the service button initiates an Internet connection to a technician support/network center. The copier, printer, or other device has a specialized videoconferencing client on board, and connects to the technician support/network center as a videoconference participant. In one embodiment, the communication between the copier, printer, or other device and the technician support/network center utilizes standard TCP transmission protocol. In another embodiment, the connection is established and maintained using a connectionless TCP connection. Additional information about connectionless TCP can be found in the above-referenced co-pending U.S. patent application Ser. No. 10/681,732.

In operation 214, the method provides for connecting to the technician support/network center. As described above in reference to FIG. 4, a dispatcher receives the service call and identifies a technician and a host server for providing the requested customer assistance. Therefore, in decision block 216, the method provides for determining whether a technician is available to receive the service call. If no technician is available, a "No" to decision block 216, the method proceeds to loop through operation 218 in which the customer is queued for the next available technician. In one embodiment, the customer remains in queue until a technician is available to attend to the service request, at which point the method proceeds to operation 220.

In operation 220, the dispatcher assigns a technician and a host server to conduct the service call. As indicated at 222, a server assessment and load balancing is effected in order to facilitate the dispatcher selecting the most appropriate of a plurality of network servers to host the service call. In one embodiment, load balancing enables the most efficient allocation of resources and ensures a higher quality of service for all customers.

Upon the assigning of a technician and host server, the session is established and the method is done. As described in detail above, in one embodiment, the printer, copier, or other device includes a customer device client (also referred to as a printer/copier client), and the technician includes a technician client. The assigned, load-balanced server includes a server component of a multi-participant conferencing system. In this manner, the technician and the copier/printer are joined as participants in a videoconference, hosted by the selected load-balanced server. The multi-participant videoconferencing system includes a back-channel connection configured, in one embodiment, to command and process device diagnostics, and to provide results data to the technician as well as to the customer. The back-channel connection for diagnostics and status is established simultaneously with the conference channel, and operates in parallel with the conference channel in accordance with an embodiment of the present invention.

Figure 8:
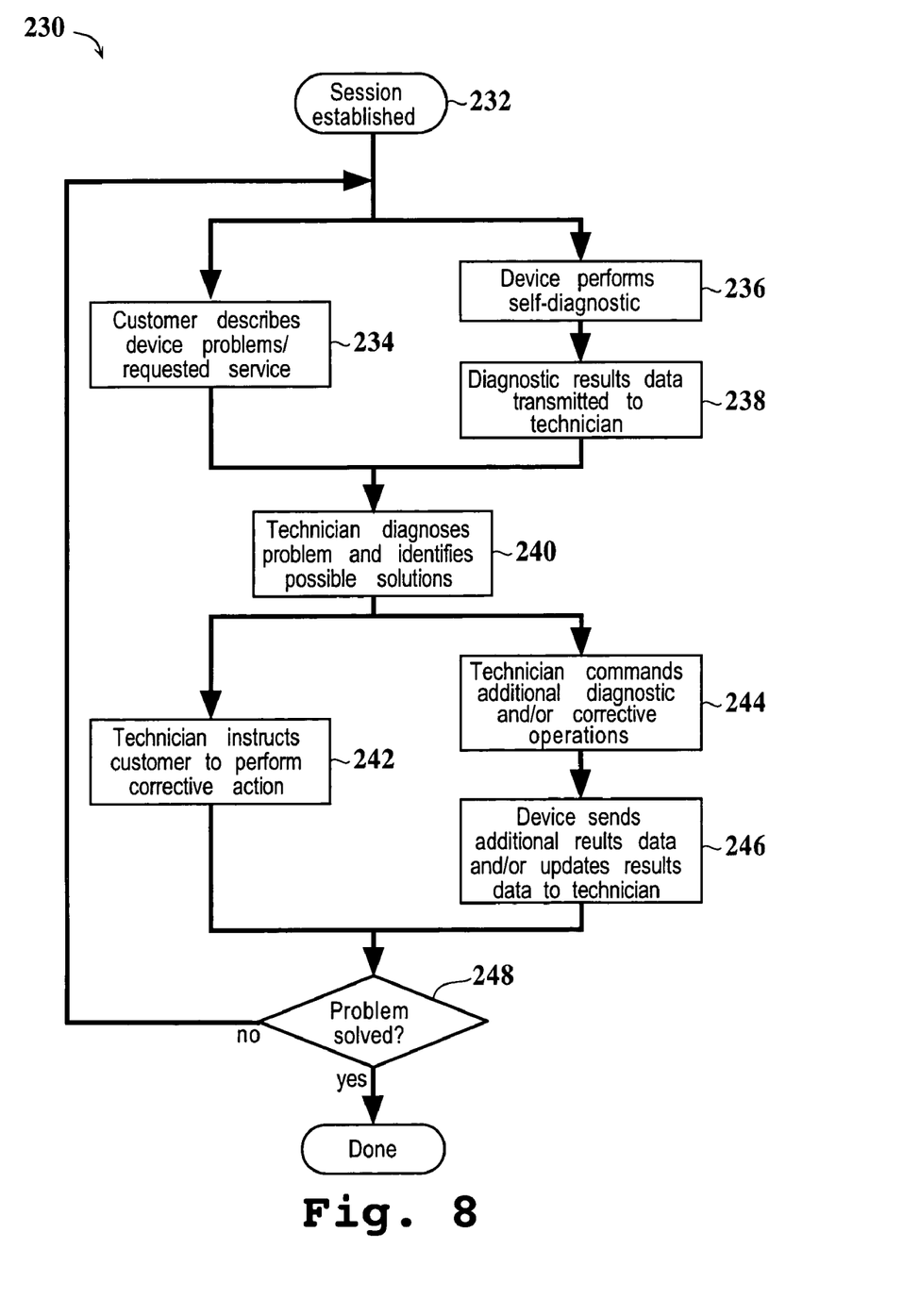
FIG. 8 is a flowchart diagram illustrating the method operations of an exemplary service call in accordance with embodiments of the present invention.

FIG. 8 is a flowchart diagram 230 illustrating the method operations of an exemplary service call in accordance with one embodiment of the present invention. As illustrated in FIG. 8, the exemplary service call begins when the session is established, shown at 232.

In one embodiment of the invention, the exemplary service call is conducted as a video conference over a conference channel, and over a back-channel for diagnostics and status. Events and operations occurring on the conference channel and on the back-channel occur essentially simultaneously in parallel. Therefore, flowchart 230 illustrates parallel operations.

Once the session is established at 232, the customer describes device problems and the service requested to the technician in operation 234. The technician can take a device history, and elicit additional detail from the customer. While this interview is occurring on the conference channel, the device is performing a self-diagnostic in operation 236, and the results data are then transmitted to the technician in operation 238. In one embodiment, the results data are also transmitted to the customer/device. In a further embodiment, a summary of results data is transmitted to the customer/device, and detailed or comprehensive results data are transmitted to the technician.

The method proceeds with operation 240 in which the technician diagnoses the problem using all the information obtained from the customer and from the diagnostics results data. The technician also identifies possible solutions to the diagnosed problems. Some solutions may require customer action at the device, and some solutions may require additional device commands issued over the back-channel using the printer/copier diagnostics/status application. Therefore, the method again proceeds with parallel operations 242 and 244.

In operation 242, the technician instructs the customer to perform corrective action. Such action may include opening a device cover and clearing a paper jam, inserting paper, ink cartridges, toner, etc. In operation 244, the technician issues additional diagnostic or corrective commands. Such commands are issued, in one embodiment, using the diagnostics/status application for the device requiring service. In the case of a copier, such commands may include, for example, self-cleaning of the ink-jet nozzles, printing a test page, etc. In one embodiment, these additional commands are issued using the diagnostics/status application of the technician client, which communicates with the diagnostics/status application of the printer/copier client over the back-channel.

Once the additional diagnostics and/or corrective actions have been performed, whether by the customer or by the device itself, the printer/copier client then transmits additional results data and/or updates the results data and device status for the technician. In one embodiment, the same additional results data and/or updated results data are provided to the printer/copier client for display on the printer/copier panel 174 (see FIG. 5). In another embodiment, a summary of results data or updated data are provided to the printer/copier client, while the comprehensive and detailed data are provided to the technician.

After reviewing the new or updated results data and status, the technician must determine whether the problem has been solved. Decision block 248 provides the mechanism in the method to evaluate whether the problem has been solved. Such a determination can include additional interview with the customer over the conference channel, in addition to evaluation of the diagnostic results data. If the technician sees no problem reflected in the results data, the technician confirms with the customer that the device is working properly and the method is done. If the problem is not resolved, or if the device is not functioning properly, the method loops back to parallel operations 234 and 236, and proceeds as already described.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data, which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A system for providing technical support for a device, comprising:
    a first client component having a first conferencing application;
    a second client component coupled to said device, said second client component having a second conferencing application;
    a server component configured to establish conference communication between said first client component and said second client component by means of said first and second conferencing applications, said conference communication being effective for distributing video and audio data streams between said first and second client components and for forwarding device diagnostic data from said device to said first client component;
    a conference channel communication connection over which the video and audio data streams are carried between the first client component and the server component and between the second client component and the server component; and
    a back-channel communication connection over which said device diagnostic data is transmitted from said device to said server component, wherein the back-channel communication connection enables said diagnostic data to be transmitted from the second client component to the first client component in real-time,
    wherein said device is a networked office tool having said second client component integrally installed within the chassis of the device, and the networked office tool is at least one of a copy machine, a facsimile machine, a scanner, or a printer.

2. The system of claim 1, further comprising:
    a network center, comprising:
        a dispatcher;
        a load balancer; and
        a plurality of network servers, each of the plurality of network servers having the server component.

3. The system of claim 1, wherein transmission over the conference channel communication connection and over the back channel communication connection occur simultaneously.

4. The system of claim 1, wherein the first client component is enabled to transmit device commands to the second client component over the back channel communication connection to execute corrective and diagnostic operations on said networked office tool.

5. The system of claim 2, wherein the dispatcher assigns the first client component and the second client component to one of the plurality of network servers to conduct a service session.

6. The system of claim 5, wherein the load balancer is enabled to provide input to the dispatcher to maintain a resource distribution among the plurality of network servers.

7. A method of providing service for networked equipment, comprising:
    providing a networked device client having a network connection and a component for implementing a multi-participant conferencing application, said networked device being at least one of a copy machine, a facsimile machine, a scanner, or a printer, said component being integrally installed within the chassis of the networked device;
    providing a service technician client having another of said multi-participant conferencing application, said service technician client being remote from said networked device client;
    providing a network support center remote from said networked device client and said service technician client, said network support center including:
        (a) a plurality of network servers, each one of the plurality of network servers having a server component of said multi-participant conferencing application, and being configured to distribute video and audio data streams between the networked device client and the service technician client, and further configured to relay device commands from the service technician client to the networked device client in a technical support conference session for execution of corrective and diagnostic operations on said networked device client;
        (b) a load balancer; and
        (c) a dispatcher;
    establishing a network connection between the networked device client, the service technician client, and the network support center;
    relaying from the networked device client to the service technician client, diagnostic data resulting from execution on said client device of device commands for diagnostic operations; and
    relaying from the service technician client to the networked device client, device commands for corrective operations in response to receipt of said diagnostic data by said service technician client;
    wherein the method is performed by communication exchange according to network communication protocol; and
    wherein the multi-participant conferencing application provides for a conference connection and a back-channel connection between the networked device client, the service technician client, and the network support center, said conference connection enabling video and audio data streams to be transmitted between the networked device client, the service technician client, and the network support center.

8. The method of claim 7, wherein the relaying of diagnostic data from the networked device client to the service technician client is accomplished over the back-channel connection.

9. The method of claim 7, further comprising:
    transmitting diagnostic commands from the service technician client to the networked device client; and
    updating diagnostic test result data, the updating being received by the service technician client,
    wherein the transmitting and the updating is accomplished over the back-channel connection.

10. The method of claim 7, wherein the establishing of the network connection between the networked device client, the service technician client, and the network support center is initiated by activation of a call button at the networked device client.

11. A back-channel communication network in a video-conferencing system, comprising:
    a networked device having a component configured to execute a peer-to-peer videoconferencing application, said networked device being at least one of a copy machine, a facsimile machine, a scanner, or a printer, said component being integrally installed within the chassis of the networked device;

a servicing device having another of said peer-to-peer videoconferencing application for establishing peer-to-peer videoconferencing with said networked device;

a back-channel controller for providing a data channel between said networked device and servicing device independent of said peer-to-peer videoconferencing application;

wherein said networked device includes a diagnostic and status application responsive to device commands received from said service device via said back-channel controller for executing diagnostic operations on said networked device and providing diagnostics results to said service device via said back-channel controller.

12. A computer readable data storage device having program instructions for execution on a computing device, comprising program instructions for:

establishing a first communication channel for video/audio data between a client device and a service device;

establishing a second communication channel for device commands and diagnostic data between said client device and said service device, said second communication channel being a back-channel communication channel;

transmitting device commands from said service device to said client device via said second channel for executing diagnostic and corrective instructions on said client device;

transmitting from said client device to said service device any resultant diagnostic data resulting from execution of the transmitted device commands on said client device;

wherein said resultant diagnostic data is transmitted over the second communication channel simultaneously with the audio/video data being supplied over the first communication channel;

wherein said client device includes a component for implementing said first communication channel for video/audio data between a client device and a service device; said client device is one of a printer, a copier, a facsimile machine, and a scanner, and said component is integrally installed within the chassis of the client device.

* * * * *